United States Patent
Theopold (10) Patent No.: US 10,578,081 B2
(45) Date of Patent: Mar. 3, 2020

(54) WIND TURBINE DIAGNOSTIC APPARATUS WITH DIVERSE SENSOR TESTING

(71) Applicant: Moog Unna GmbH, Unna (DE)

(72) Inventor: Tobias Theopold, Dortmund (DE)

(*) Notice: Subject to any disclaimer, the term of this patent is extended or adjusted under 35 U.S.C. 154(b) by 348 days.

(21) Appl. No.: 15/380,337

(22) Filed: Dec. 15, 2016

(65) Prior Publication Data

US 2017/0175708 A1    Jun. 22, 2017

(30) Foreign Application Priority Data

Dec. 18, 2015 (GB) .................................. 1522385.2

(51) Int. Cl.
F03D 7/04    (2006.01)
F03D 17/00   (2016.01)
F03D 7/02    (2006.01)

(52) U.S. Cl.
CPC .............. F03D 7/04 (2013.01); F03D 7/022 (2013.01); F03D 7/0224 (2013.01); F03D 7/0244 (2013.01); F03D 7/0264 (2013.01); F03D 17/00 (2016.05); F05B 2260/42 (2013.01); F05B 2260/79 (2013.01); F05B 2260/80 (2013.01); Y02E 10/723 (2013.01)

(58) Field of Classification Search
CPC ........ F03D 7/04; F03D 7/0244; F03D 7/0224; F03D 7/0264; F03D 17/00; F03D 7/022; G01R 31/44; G01R 31/36; F05B 2260/42; F05B 2260/80; F05B 2260/79
USPC .......................................................... 416/1
See application file for complete search history.

(56) References Cited

U.S. PATENT DOCUMENTS

| | | | | |
|---|---|---|---|---|
| 6,278,279 B1 * | 8/2001 | Daun-Lindberg | ..... | G01R 31/40 324/427 |
| 6,583,523 B1 * | 6/2003 | Bhate | ........................ | H02J 1/10 307/48 |
| 7,308,614 B2 * | 12/2007 | Kojori | ................ | G05B 23/0289 701/33.8 |
| 7,740,448 B2 * | 6/2010 | Meyer | ................... | F03D 7/0224 416/1 |
| 8,364,287 B2 * | 1/2013 | Pearson | ............ | H01M 8/04619 320/101 |
| 2006/0163882 A1 * | 7/2006 | Brandt | .................. | F03D 7/0224 290/44 |

(Continued)

FOREIGN PATENT DOCUMENTS

CN    103413983 A    11/2013
CN    103472406 A    12/2013

(Continued)

*Primary Examiner* — J. Todd Newton
(74) *Attorney, Agent, or Firm* — Leydig, Voit & Mayer, Ltd.

(57) ABSTRACT

A wind turbine with pitch motors for pitching rotor blades, further comprises a first sensor unit and a second sensor unit configured to measure at least one of a voltage value and a current value at a first location and a second location, wherein the voltage value and current value are indicative of the condition of a backup power supply. When the second location is different from the first location the measurement results are independent from each other. A comparison of the two measurements then gives a level of confidence how these measurements match each other. In case of a low level of confidence the pitch drive motors are caused to pitch the rotor blades into a feathering position.

13 Claims, 3 Drawing Sheets

(56) References Cited

U.S. PATENT DOCUMENTS

| | | | |
|---|---|---|---|
| 2007/0024227 A1 | 2/2007 | Kunkel et al. | |
| 2007/0090797 A1* | 4/2007 | Glosser, Jr. | H02J 7/0018 |
| | | | 320/116 |
| 2010/0060000 A1* | 3/2010 | Scholte-Wassink | |
| | | | F03D 7/0272 |
| | | | 290/44 |
| 2011/0049903 A1* | 3/2011 | Jorgensen | F03D 7/0224 |
| | | | 290/55 |
| 2012/0063900 A1 | 3/2012 | Kestermann | |
| 2012/0087792 A1* | 4/2012 | Cousineau | F03D 7/0224 |
| | | | 416/1 |
| 2012/0290235 A1 | 11/2012 | Schaefer | |
| 2012/0299747 A1 | 11/2012 | Schubert | |
| 2013/0241209 A1* | 9/2013 | Andersen | F03D 7/028 |
| | | | 290/55 |
| 2013/0323055 A1 | 12/2013 | Eden | |
| 2015/0184634 A1* | 7/2015 | Shen | F03D 7/0224 |
| | | | 416/147 |
| 2015/0219725 A1* | 8/2015 | Fassnacht | G01R 29/02 |
| | | | 324/426 |
| 2017/0175708 A1* | 6/2017 | Roesmann | F03D 7/0264 |
| 2017/0373625 A1* | 12/2017 | Andersen | F03D 7/0284 |
| 2018/0181967 A1* | 6/2018 | Beaston | G06Q 30/012 |
| 2018/0291870 A1* | 10/2018 | Theopold | F03D 7/0224 |

FOREIGN PATENT DOCUMENTS

| | | |
|---|---|---|
| CN | 103779947 A | 5/2014 |
| CN | 104158239 A | 11/2014 |
| EP | 1 763 126 A1 | 3/2007 |
| EP | 2824321 A1 | 1/2015 |
| ES | 2274698 A1 | 5/2007 |

\* cited by examiner

WIND TURBINE DIAGNOSTIC APPARATUS WITH DIVERSE SENSOR TESTING

FIELD OF INVENTION

The present invention relates to the implementation of power backup systems used in wind turbines. In particular, the present invention relates to improving the reliability of measurements of power backup systems.

BACKGROUND

Wind turbines typically comprise an electrical backup system, which is provided to increase safety and put the turbine into an idle mode during an emergency situation, for example during loss of a normal power supply. The backup system takes the form of a backup power supply that is often either powered by batteries or ultra-high capacity capacitors. In the event that a main power supply is lost or is unable to pitch the rotor blades, the backup power supply provides the rotor blade pitch motors with enough energy to pitch the rotor blades to a so-called "feathering position". Once in the feathering position, the rotor blades act to retard the rotation of the turbine such that eventually the rotor comes to a halt and no further power is generated and the turbine is put in an idle mode.

It is important that the functionality of the backup system is verified regularly. The Guideline for the Certification of Wind Turbines, Edition 2010, as well as the International Standard (IEC 61400-1) for the design requirements of wind turbines require that the back-up and safety system of a wind turbine is tested every week.

Methods for performing a test procedure can be found in European patent application EP2824321 A1. Such methods require the measurement of the discharge current and voltage of the backup power supply during testing. Ensuring an acceptable level of confidence in such measurements is an important consideration when testing backup power supplies, as it provides an indication that the measurements can be trusted, and hence provide an indication that the test results can be trusted.

SUMMARY OF INVENTION

In order to at least partially address the issues above, the present invention provides an apparatus a method as defined by the appended claims. In particular, the present invention provides a wind turbine comprising: a backup power supply; and a first sensor unit and a second sensor unit configured to measure at least one of a voltage value and a current value, wherein the voltage value and current value are indicative of the condition of the backup power supply; wherein the first sensor unit is configured to measure the at least one of the voltage value and the current value at a first location in the wind turbine; and wherein the second sensor unit is configured to measure the at least one of the voltage value and the current value at a second location in the wind turbine different from the first location.

In some embodiments, the wind turbine further comprises a processor configured to: compare the at least one of the voltage value and current value measured by the first sensor unit with the at least one of the voltage value and current value measured by the second sensor unit; and assign a level of confidence to the at least one of the voltage value and current value measured by the first sensor unit based on the comparison.

Advantageously the invention provides a means for assessing the plausibility of measurements of the charging current/voltage of a backup power supply as taken by a first sensor unit. Thus the present invention provides for the identification of instances in which measurements of the properties of the backup supply could potentially be less trustworthy, and hence the condition of the backup power supply is less well known, allowing for appropriate measures to be taken. Thus the present invention improves the safety of a wind turbine.

Optionally, the first location is close to the backup power supply, and the second location is remote from the backup power supply. In one example the first location is at a control unit and the second location is at the at least one pitch drive unit. This provides advantages in terms of allowing one of the sensors to be placed in a location suitable for maximum measurement accuracy, whilst the other is placed in a location in which environmental conditions (for example temperature) are better for device integrity or in a location that is easy to access for maintenance/retrofitting et cetera. In some examples, the turbine comprises one pitch drive unit per rotor blade, each pitch drive unit having a backup power supply, and preferably there is provided a different sensor at each of the pitch drive units. Advantageously one sensor at the control unit allows measurements by each of the sensors in the pitch drive units to be assessed.

Optionally the processor is further configured to determine at least one of a pitch motor voltage, a pitch motor current, a current drawn by a brake chopper, and voltage associated with the brake chopper, a current drawn by a smoothing capacitor and a voltage associated with a smoothing capacitor; and compare the at least one of the voltage value and current value measured by the first sensor unit with the at least one of the voltage value and current value measured by the second sensor unit, based on the at least one of the pitch motor voltage, a pitch motor current, a current drawn by a brake chopper, and voltage associated with the brake chopper, a current drawn by a smoothing capacitor and a voltage associated with a smoothing capacitor. Thus the processor is configured to account for current drawn and voltage drops associated with other electrical components present at the pitch drive unit. Beneficially, this allows the pitch drive motor to be operated whilst measurement of the charging current/voltage is made, which in turn allows the rotor associated with the pitch drive unit to be operated whilst the backup supply characteristics are being quantified. Thus the power the wind turbine can generate during the testing of the backup supply can be increased.

Optionally the wind turbine further comprises a diode (such as a decoupling diode) between the first location and second location, wherein the diode is provided to substantially allow current to flow in a first direction towards the backup power supply and substantially prevent current flowing in a second direction opposite to the first direction; wherein the processor is further configured to determine if the diode is operating correctly based on the comparison of the at least one of the voltage value and current value measured by the first sensor unit with the at least one of the voltage value and current value measured by the second sensor unit. Thus advantageously the arrangement of two sensors at remote locations also allows for the operation of a decoupling diode to be verified.

In some embodiments, one of the sensor units is retrofitted at the wind turbine. For example the retrofitted sensor unit may be of a robust type, and/or have a higher SIL than the pre-existing sensor unit, improving a safety integrity level associated with the wind turbine. In some embodiments, the retrofitted sensor unit has reduced complexity as compared to the pre-existing sensor unit, thus reducing maintenance requirements and improving the reliability of the plausibility check of the pre-existing sensor.

BRIEF DESCRIPTION OF THE DRAWINGS

Embodiments of the invention are now described, by way of example only, with reference to the accompanying drawings in which.

DETAILED DESCRIPTION

The present invention provides a robust system in which the reliability of measurements of the characteristics of a backup power supply can be improved. By increasing confidence in the measurements, the operation characteristics of the backup power supply can be known with more confidence, thus improving the safety of the wind turbine itself. In case the detected level of confidence is so low that the wind turbine should be considered to be no longer in a safe state, i.e. no longer in a state where the wind turbine for example can be stopped at any time, appropriate measures can be taken. An appropriate measure for example is to transit the wind turbine in a feathering position and keep it in this state until for example a technician has visited the wind turbine and has changed the faulty parts that caused the low level of confidence. Comparing values generated at different locations is more reliable, then just doubling the number of sensors, if they are still located next to each other. Two sensors next to each other may suffer from the same failure, i.e. too high temperature. Comparing the measurement of two sensors which are in vicinity to each other increases their level of confidence to some degree. The invention makes sure that the measurements are as independent as possible on each other and therefore increases the reliability of a plausibility check.

Such provisions may result in the wind turbine having a higher safety integrity level (SIL). Moreover, the present invention allows for the easy retrofitting and maintenance of a second sensor unit to improve the safety of pre-existing wind turbines.

Figure 1A:
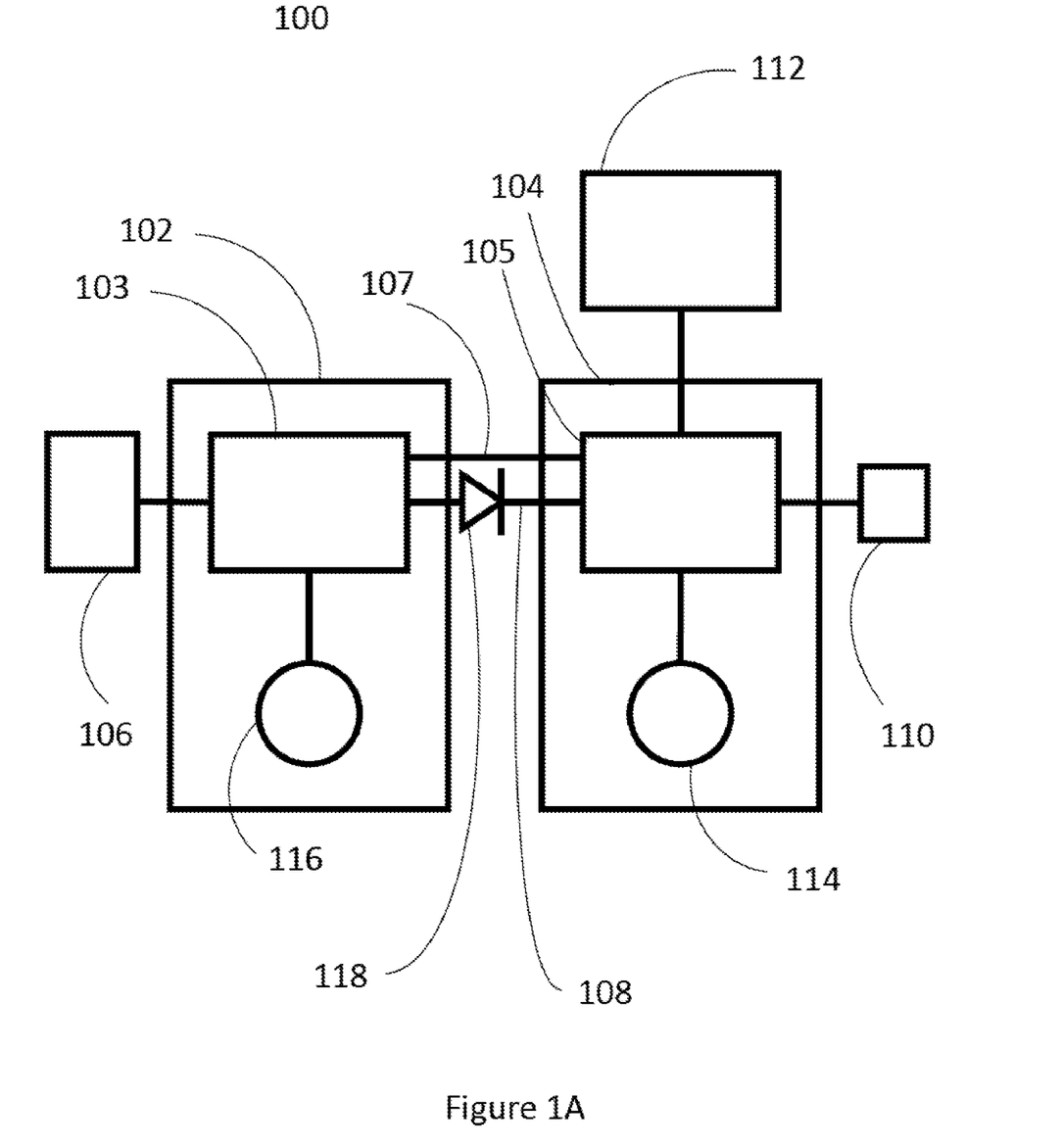
FIG. 1A shows a schematic of a wind turbine in accordance with a preferred embodiment of the present invention.

FIG. 1A shows a schematic representation of certain internal components of a wind turbine 100 in a preferred embodiment of the invention. The wind turbine 100 includes a central unit 102 comprising central circuitry 103, and a pitch drive unit 104 comprising pitch drive circuitry 105. The central unit is connected to a main power supply 106, and is connected to the pitch drive unit 104 via a bus 107 (also known as a field bus) and a power connection 108. The wind turbine also comprises a decoupling diode 118 positioned between the central unit 102 and the pitch drive unit 104, configured to allow a flow of the power supply current from the central unit 102 to the pitch drive unit 104 but not vice versa. The main power supply 106 may be a connection to a power grid. The pitch drive unit 104 is connected to a pitch motor 110. In a preferred embodiment, the central unit is located in a rotating hub (not shown) of the wind turbine 100. In another embodiment, the central unit is located in a nacelle (not shown) of the wind turbine 100.

During normal operation, the main power supply 106 supplies power to the central unit 102. The central unit provides power to the pitch drive unit 104 via the power connection 108 and control signals to the pitch drive unit 104 via the bus 107. The pitch drive unit 104 provides power to the pitch drive motor 110, and the control signals are interpreted by pitch drive unit circuitry 105, and used to control the pitch drive motor, thereby controlling the pitch of the rotor blades of the wind turbine (not shown).

The wind turbine also comprises a backup power supply 112. The backup power supply may be an electrochemical battery, or more preferably a high capacity capacitor such as a super capacitor. The backup power supply 112 is connected to the pitch drive unit 104, and is configured to provide enough power to the pitch drive motor to allow the rotor blade (not shown) to be pitched into a feathering position in an emergency. Such an emergency may be for example a failure in the main power supply 106, or other event leading to the loss of power at the pitch control unit.

FIG. 1A shows a single pitch drive unit 104 and a single pitch drive motor 110. It will be appreciated that the wind turbine 100 may contain further pitch drive units and motors. Indeed, a wind turbine will typically include one pitch drive motor per rotor blade. Furthermore, in a preferred embodiment, a different pitch drive unit is provided for each rotor blade. For example, a wind turbine having three rotor blades preferably has three pitch drive units, wherein each pitch drive unit controls a pitch drive motor for one of the rotor blades. The pitch drive units are preferably connected to the central unit 102 by separate busses. Backup power supply 112 may be connected to all pitch drive units, though preferably a different backup power supply is provided for each pitch control unit. Beneficially this increases the safety of the wind turbine, since in the event that one backup supply did not function correctly, the remaining backup power supplies could be used to put the remaining blades into a feathering position at safely stop the turbine.

Operation of the backup power supply 112 may be tested as described in EP2824321 A1. This testing procedure involves isolating the pitch drive unit 104 from the central unit 102 via by operating a switch (not shown) connected to the power connection 108 so as to prevent power being provided to the pitch drive unit 104 and performing a stress test of the backup power supply 112 associated with the pitch drive unit 104. During the stress test, the backup power supply 112 is discharged so as to deliver a current to the pitch drive unit 104, the current preferably being the current required to pitch the associated rotor blade into a feathering position or a greater current. In some embodiments, the current supply enables the pitch drive motor 110 to continue normal operation during the stress test, thus enabling greater power to be generated by the wind turbine during the stress test than if the pitch drive motor was not in normal operation during the stress test. After performing the stress test, the pitch drive unit 104 is reconnected to the central unit 102 using the switch, and the backup power supply 112 is recharged. During recharging, the backup supply 112 draws a charging current and has an associated charging voltage. The charging current and charging voltage are indicative of the condition of the backup power supply 112, and thus measurements of the charging voltage/current provide an indication as to whether the backup power supply 112 is functioning correctly. Alternatively, the stress test is performed when the turbine 100 is in an idle position, in which case no power is generated. For example, the stress test may be performed when there is little or no wind in order to minimise the impact that performing the stress test has on power generation.

In the present invention, a first sensor unit 114 is provided to measure either the charging current of the backup supply 112, the charging voltage of the backup supply 112, or both during testing of the backup power supply 112. The skilled person will appreciate that the first sensor unit 114 may comprise separate elements for the measurement of current and the measurement of voltage. For example the first sensor unit 114 may comprise a plurality of sensors, wherein one or more sensors are configured to measure current, and one or more sensors are configures to measure voltage. Preferably the first sensor unit is located at the pitch drive unit 104 as shown in FIG. 1A or at the backup power supply 112. Preferably the first sensor unit 114 takes measurements at a position close to the backup power supply 112, i.e. the measurements of charging current/voltage are taken directly. Advantageously this positioning reduces any negative effect that any resistive losses due to other components in the wind turbine have on the measurement—put differently, measurements at the preferred position are more accurate due to taking account of current losses in other parts of circuitry within the turbine. Thus the preferred positioning beneficially allows for accurate measurement of the charging current and voltage. Taking measurements at effectual two locations remote to each other increase the reliability of the two measurements when compared with each other. In some embodiments, another diversity effect is achieved when the first sensor unit 114 is chosen as a sensor based on the utilization of a different physical effect for the measurement than the second sensor unit. For example for the first sensor unit 114 a current sensor comprising a Hall-element may be chosen, which in addition also advantageously provides highly accurate measurements of current. For wind turbines comprising more than one pitch drive unit, preferably a first sensor unit 114 is provided for each pitch drive unit.

Preferably the wind turbine comprises a further, second sensor unit 116. The second sensor unit is also configured to measure either the charging current of the backup supply 112, the charging voltage of the backup supply 112, or both during testing of the backup power supply. As with the first sensor unit(s) 114, the second sensor unit may comprise separate elements for the measurement of current and the measurement of voltage, for example one or more sensors for measuring current and one or more sensors for measuring voltage.

Preferably the first sensor unit 114 and second sensor unit 116 are configured to send measurement data to a remote computing system (not shown). For example, the central circuitry 103 may comprise a connection to a communications link (not shown) via which data can be sent to the remote computing system. The first sensor unit 114 preferably sends measurement data to the central unit circuitry 103, for example via the bus 107, wherein the central unit circuitry 103 then sends the data to the remote computing system. Similarly the second sensor unit 116 sends data to the central unit circuitry 103 for forwarding to a remote computing system, for example via the bus 107 or via another connection, depending on the location of the second sensor unit 116 within the wind turbine 100.

In an alternative embodiment, the measurement data from the first sensor unit 114 and second sensor unit 116 are stored locally at the wind turbine.

Advantageously, the provision of the second sensor unit 116 provides a means for determining whether the measurements taken by the first sensor unit 114 can be trusted. Preferably the measurements taken by the second sensor unit 116 are compared to the measurements taken by the first sensor unit 114, and based on the comparison a level of confidence is assigned. The level of confidence is an indication of whether the measurements from the first 114 and/or second sensor unit 116 can be trusted. When comparing the values measured by the first sensor unit 114 and the second sensor unit 116, any discrepancy between the values can be compared to a threshold, and depending on whether the threshold is exceeded or not, a level of confidence, i.e. an indication of whether or not the measurements from the first sensor unit 114 and/or second 116 sensor unit can be trusted as being accurate (i.e. whether the measurements are plausible). For instance, if the measurements of the charging current/voltage taken by the first sensor unit 114 and second sensor unit 116 are the same or similar, a high level of confidence may be assigned to the measurements taken by the first sensor unit 114 (or second sensor unit 116, or both), whereas if the results are significantly different, a low level of confidence in the measurements of the first sensor unit (or second sensor unit 116, or both) may be assigned. Accordingly, the second sensor unit 116 verifies the plausibility of measurements taken by the first sensor unit 114. In one embodiment the remote computing system is configured to compare the measurement data provided by the first sensor unit 114 and the second sensor unit 116, and assign a level of confidence in the measurements of either the first sensor unit 114, the second sensor unit 116 or both based on the comparison. Alternatively, the comparison is performed locally at the wind turbine, for example using processing circuitry (not shown). Preferably such processing circuitry is located at the central unit 102, and for example may comprise a safety card having a high SIL rating, wherein the safety card is an additional hardware device that can be retrofitted to a wind turbine.

In some embodiments a difference in the measured values from the first sensor unit 114 and the second sensor unit 116 of 10% or less may be assigned a high level of confidence, whereas a difference of more than 10% may be assigned a low level of confidence. Alternatively, the distinction between a high level of confidence and a low level of confidence may be associated with a different threshold value, for example a difference between measured values of 5%, or 15% or 20%. Alternatively, more than two levels of confidence may be utilised, for example a difference of 10% or less might be assigned a high level of confidence, a difference of between 10% and 20% an intermediate level of confidence, and a difference of more than 20% a low level of confidence—in such cases, a high level of confidence would indicate that the measurement of the first sensor unit 114 is trusted and no action need be taken, an intermediate level may provide a warning indicating that more measurements should be taken to ascertain the reliability of the first sensor unit, and a low level indicating that the first sensor unit 116 cannot be trusted and requires replacement or maintenance. Though the above describes comparing relative differences between the measurements (such as percentage differences), absolute differences between measurements may also be used to compare to a threshold value to determine a level of confidence.

Preferably, in response to determining a low level of confidence, the wind turbine is put into a safe mode (i.e. an idle mode) in which the pitch drive motors 110 in the wind turbine are configured to pitch the rotor blades into a feathering position, such that rotation of the turbine stops. In other words the turbine is made safe if the trustworthiness of the measurements is not sufficient, i.e. if the difference in measurements is above a predetermined threshold. Thus risk of damage to the wind turbine, to persons or to the environment is reduced in situations in which it is not reliably known whether the backup supply 112 is functioning correctly.

Preferably the second sensor unit 116 is of a different type to the first sensor unit 114, i.e. it employs different hardware provisions, measurement techniques and/or analysis techniques. In some embodiments, the first and second sensor units are provided by different suppliers. By utilising diverse apparatus for the first sensor unit 114 and the second sensor unit 116, the confidence in the measured values can be increased. In particular, such a first sensor unit 114 and a second sensor unit 116 are less likely to suffer from the same possible sources of systematic error. Thus if the measured values from both sensor units agree, and it is unlikely that both measured values are subject to the same systematic error, greater confidence can be placed on the veracity of the measurements.

In some embodiments, the second sensor unit 116 is of a type that is of reduced complexity as compared to the first sensor unit 114, and therefore the second sensor unit 116 can be inexpensive whilst being able to adequately verify the plausibility of the measurement taken by the first sensor unit 114. Less complex sensor units may also be robust, and thus require infrequent maintenance.

Thus it can be determined whether a first sensor unit 114 and/or a second sensor unit 116 may require repair, recalibration or replacement remotely, (i.e. when it is determined that the sensor units do not agree) without the need to first send an engineer to assess the functionality of the first sensor unit 114 and the second sensor unit 116. As will be appreciated, as the components shown in FIG. 1A are typically located in the hub of a wind turbine, which is difficult to access—particularly in the context of off-shore wind turbines. Accordingly reducing the need to send engineers to test components in a wind turbine reduces the cost associated with such testing.

Preferably the second sensor unit 116 is positioned at a location within the wind turbine that is remote from the first sensor unit 114, i.e. the first and second sensor units are positioned at different hardware components within the wind turbine that are separated spatially (for example the first sensor unit 114 and second sensor unit 116 may be separated by 1 m or more). Preferably the second sensor unit 116 takes measurements at a position remote from the backup power supply 112, i.e. the measurements of charging current/voltage are taken indirectly. Preferably, the second sensor unit 116 is positioned at the central unit 102 whilst the first sensor unit 114 is positioned at the pitch control unit 104 as shown in FIG. 1A. Advantageously, the inventors have discovered that the charging current and voltage are substantially the same at positions in both the central unit 102 and the pitch drive unit 104, apart from minor losses associated with the decoupling diode 118. The expected losses associated with the decoupling diode 118 may be estimated using techniques known in the art, and accounted for in the comparison of the measured values in an appropriate manner. Advantageously, if after accounting for expected losses in the decoupling diode 118 the values measured by the first sensor unit 114 and the second sensor unit 116 agree, the comparison also provides an indication that the decoupling diode 118 is functioning correctly. If the measured values differ, there may be an indication that losses over the decoupling diode 118 differ from expected values, indicating a possible malfunction in the decoupling diode 118. Alternatively the second sensor unit 116 may be positioned at a location on the power connector 108, or any other location at which the charging current and/or voltage of the backup supply 112 may be measured during performance of a backup supply stress test that is remote from the position of the first sensor unit 114.

Such positioning of the first sensor unit 114 and the second sensor unit 116 provides a number of advantages. Firstly the behaviour of the first sensor unit 114 and the second sensor unit 116 may be affected by temperature or other environmental conditions. The first sensor unit 114, being positioned at or near the pitch drive unit 104, may be subject to increased temperature due to the operation of the pitch drive motor 110. By positioning the second sensor unit 116 at a different location within the turbine, further away from the pitch drive motor, the second sensor unit 116 may be positioned in an environment having a more stable temperature, thus allowing for identification of instances in which temperature might be adversely affecting the performance of the first sensor unit 114. Secondly, the second sensor unit 116 may be installed in an easily accessible location within the turbine, whereas the first sensor unit at or near the pitch drive unit may be more difficult to access. Therefore the positioning of the second sensor unit 116 enables easy access for maintenance or repair of the second sensor unit 116. Moreover, the positioning of the second sensor unit 116 enables the easy retrofitting of a second sensor unit 116 to a pre-existing wind turbine having only a first sensor unit 114—thus measurements of charging voltage/current for pre-existing turbines previously only having a first sensor unit 114 can be verified, and thus confidence in the measurements be improved.

Optionally the second sensor unit 116 has a higher safety integrity level (SIL) rating than the first sensor unit 114. Thus when retrofitting the second sensor unit 116 to a pre-existing wind turbine having only one or more first sensor units 114, the SIL rating of the wind turbine is improved.

Optionally, the second sensor unit 116 includes a failsafe indicator, wherein the failsafe indicator includes diagnostic circuitry configured to determine whether the second sensor unit 116 is functioning correctly. Preferably the failsafe indicator is configured to transmit an indication to the remote computing system, wherein the indication indicates whether or not the second sensor unit 116 is functioning correctly. Beneficially, this allows the remote computing system to determine whether measurement form the second sensor unit 116 is trustworthy, and hence allows for the identification of situations in which neither the first sensor unit 114 or the second sensor unit 116 may be operating correctly, but the measured values returned by both sensor units are in agreement. Thus the provision of a failsafe further improves the reliability of the measured values.

Figure 1B:
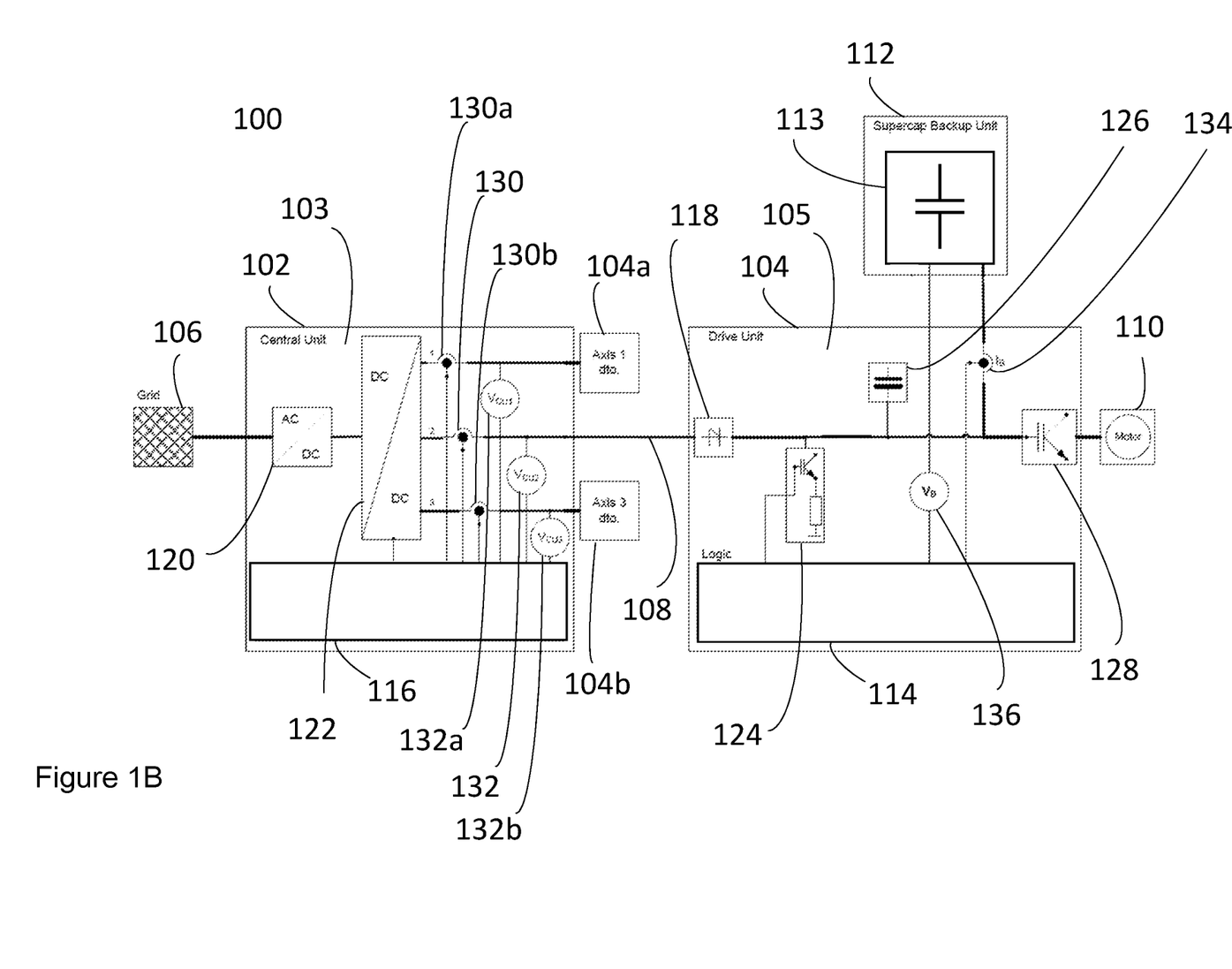
FIG. 1B shows a schematic of a wind turbine in accordance with a preferred embodiment of the present invention.

FIG. 1B shows a different schematic of the wind turbine 100 of FIG. 1A, showing further detail of the components of the wind turbine 100 in accordance with a preferred embodiment. Like reference numbers designate like components. FIG. 1B shows the central unit 102 connected to the pitch drive unit 104 and to two further pitch drive units 104a, 104b. Preferably a separate pitch drive unit 104, 104a, 104b is provided for each rotor blade of the wind turbine 100, thus allowing the pitch of each blade to be controlled separately. The central unit 102 comprises central circuitry 103, which preferably includes an AC/DC converter 120, and a DC/DC converter 122, wherein the AC/DC and DC/DC converters 120 122 act to convert AC power from the main power supply 106 into DC power suitable for powering the pitch drive motor 110, and other components requiring power. For example, the AC/DC converter 120 and the DC/DC converter 122 preferably also provide DC power suitable for the first sensor unit 114 and second sensor unit 116, advantageously removing the need for separate power supplies for the first sensor unit 114 and the second sensor unit 116. Alternatively different power supplies may be provided for the first sensor unit 114 and the second sensor unit 116.

Preferably the second sensor unit 116 is configured to measure current and voltage characteristics for backup supplies associated with each pitch drive unit 104, 104a, 104b. For example, the second sensor is connected to power connections for each of the pitch drive units 104 104a 104b. The second sensor unit 116 can then measure the current via a measurement connection 130, 130a, 130b and voltage via another measurement connection 132, 132a, 132b for each pitch drive unit 104, 104a, 104b. Advantageously, this allows a single second sensor unit 116 to be used to verify the plausibility of the measurements of each first sensor unit 114 associated with the different backup power supplies 112.

The pitch drive circuitry 105 preferably includes a brake chopper 124 configured to brake the pitch drive motor 110 when necessary by selectively short circuiting the windings of the motor such that the electro motive force generated by the rotation of the motor acts against the direction of rotation. The pitch drive circuitry preferably also includes a smoothing capacitor 126 configured to smooth the current provided by the AC/DC and DC/DC converters 120, 122 to the pitch motor 110, thereby ensuring more effective operation of the motor 110. The pitch drive circuitry also preferably comprises a motor drive unit 128 for controlling the motor 110. FIG. 1B shows the decoupling diode 118 being located at the pitch drive unit 104, though it will be appreciated that the diode 118 may be located at the central unit 102 or at a location along the power connector 108. In a preferred embodiment, the backup power supply 112 comprises a supercapacitor 113. Alternatively a battery may be provided.

In some aspects of the invention, each first sensor unit 114 is connected to a backup power supply 112, and configured to measure the current flowing into/out of the backup supply 112 directly via a first connection 134. Each first sensor unit 114 is also configured to measure the voltage associated with the backup supply 112 directly via another connection 136.

In the system as shown in FIG. 1B, the total current I measured by a second sensor 116 at the central unit 102 can be described by the following equation:

$$I = I_{ch} I_{sm} I_b + I_m + I_{log};$$

wherein $I_{ch}$ is a first current drawn by the brake chopper 124, $I_{sm}$ is a second current drawn by the smoothing capacitor 126, $I_b$ is a third current drawn by the backup power supply 112, $I_m$ is a fourth current drawn by the motor, and $I_{log}$ is a fifth current drawn by any logic at the pitch drive unit 104 (including any current drawn by the first sensor unit 114). If measurement is made whilst the wind turbine is in an idle mode, the first current $I_{ch}$, the second current $I_{sm}$ and the fourth current $I_m$ will be zero.

As noted above, in some embodiments, local processing circuitry is configured to perform the comparison of measurements made by the first sensor unit 114 and the second sensor unit 116. Optionally, processing circuitry is configured to account for the first current $I_{ch}$ used by the brake chopper 124, the second current $I_{sm}$ drawn by smoothing capacitor 126 and the fourth current $I_m$ drawn by the pitch motor 110 when performing the comparison. For instance, the processing circuitry may subtract the first current $I_{ch}$ drawn by the brake chopper 124, the second current $I_{sm}$ drawn by smoothing capacitor 126 and the fourth current $I_m$ drawn by the pitch motor 110 from the current measured by the first sensor unit 114 at the pitch drive unit 104 to determine the third current $I_b$ drawn by the backup supply 112 whilst it recharges. In one embodiment, the currents/voltages associated with the brake chopper 124, the smoothing capacitor 126 and the pitch motor 110 are estimated using a predetermined model of the operation of the wind turbine, and/or estimated based on information from a pitch motor controller (not shown) indicating the current operations being performed by the pitch motor 110. Alternatively, the currents/voltages associated with the brake chopper 124, the smoothing capacitor 126 and the pitch motor 110 are measured directly by further sensing units (not shown). Advantageously, by providing means for accounting for current drawn/voltage losses associated with these components, measurement of the charging current/voltage of the backup supply can be made whilst the pitch motor 110 is in use—accordingly all rotor blades may be used normally whilst the measurements are made, increasing (or at least maintaining) the power the wind turbine 100 is able to generate whilst the measurements are taking place. Whilst the above describes the use of processing circuitry at the wind turbine 100 for performing the comparison and taking into account the properties of elements of the pitch drive circuitry 105, it will be appreciated that these functions could be performed by the remote computing system discussed above.

As another alternative, the measurements taken by the first sensor unit 114 and second sensor unit 116 are taken when the wind turbine is idle, such that no fourth current $I_m$ is drawn by the pitch motor 110. Beneficially this obviates the need for further sensors to be employed to measure current/voltage use of other components in the pitch drive unit 104, or for models to be used to estimate the current/voltage use. Thus fewer components are required/less computational analysis is required in turn reducing the cost and complexity of the wind turbine. In this embodiment, it is preferred that measurements are taken during periods of no or low wind, in which the wind turbine would not be generating power anyway, advantageously allowing the wind turbine to continue generating power when there is adequate wind for power generation without putting it into an idle mode for performing a plausibility check on using the first sensor unit 114 and the second sensor unit 116.

The absolute value of the measurements provided by the first sensor unit 114 and/or the second sensor unit 116 may also be used to decide whether or not to put the wind turbine into a safe, idle mode in which the rotor blades are pitched into feathering positions. For example, if the charging voltage measured is lower than a predetermined level, or if the charging current and voltage are indicative of the backup unit 112 being capable of storing a maximum amount of energy that is less than a predetermined amount, it can advantageously be determined that the backup power supply 112 requires repair or replacement. Such a determination can be made locally at the wind turbine, for example in processing circuitry (not shown) present at the central unit 102. In response to the determination, the pitch drive units 104 operate the pitch drive motors 110 to put the rotor blades into a feathering position.

In a further embodiment, the measurements made by the first sensor unit 114 associated with a particular pitch drive unit 104 can be compared with measurements made by other first sensors associated with other pitch drive units. For example, respective measurements of charging current/voltage for each pitch drive unit can be compared. Beneficially, this comparison can provide confirmation that the backup supplies associated with each pitch drive unit are performing in a similar manner—if measurements for one pitch drive unit 104 indicate that the backup supply 112 for that pitch drive unit has characteristics that are different to characteristics for other backup supplies in the wind turbine 100, it may be indicative of a fault with said backup power supply 112 and/or indicate that that backup supply 112 is aging differently to the other backup supplies. Thus it can be identified that a particular backup power supply may need repair or replacement. This comparison is preferably made locally at the wind turbine, for example using processing circuitry present at the central unit 102. In a less preferred embodiment, data from the first sensors of each pitch drive unit is sent to a remote computing system and the comparison is performed at the remote computing system.

Figure 2:
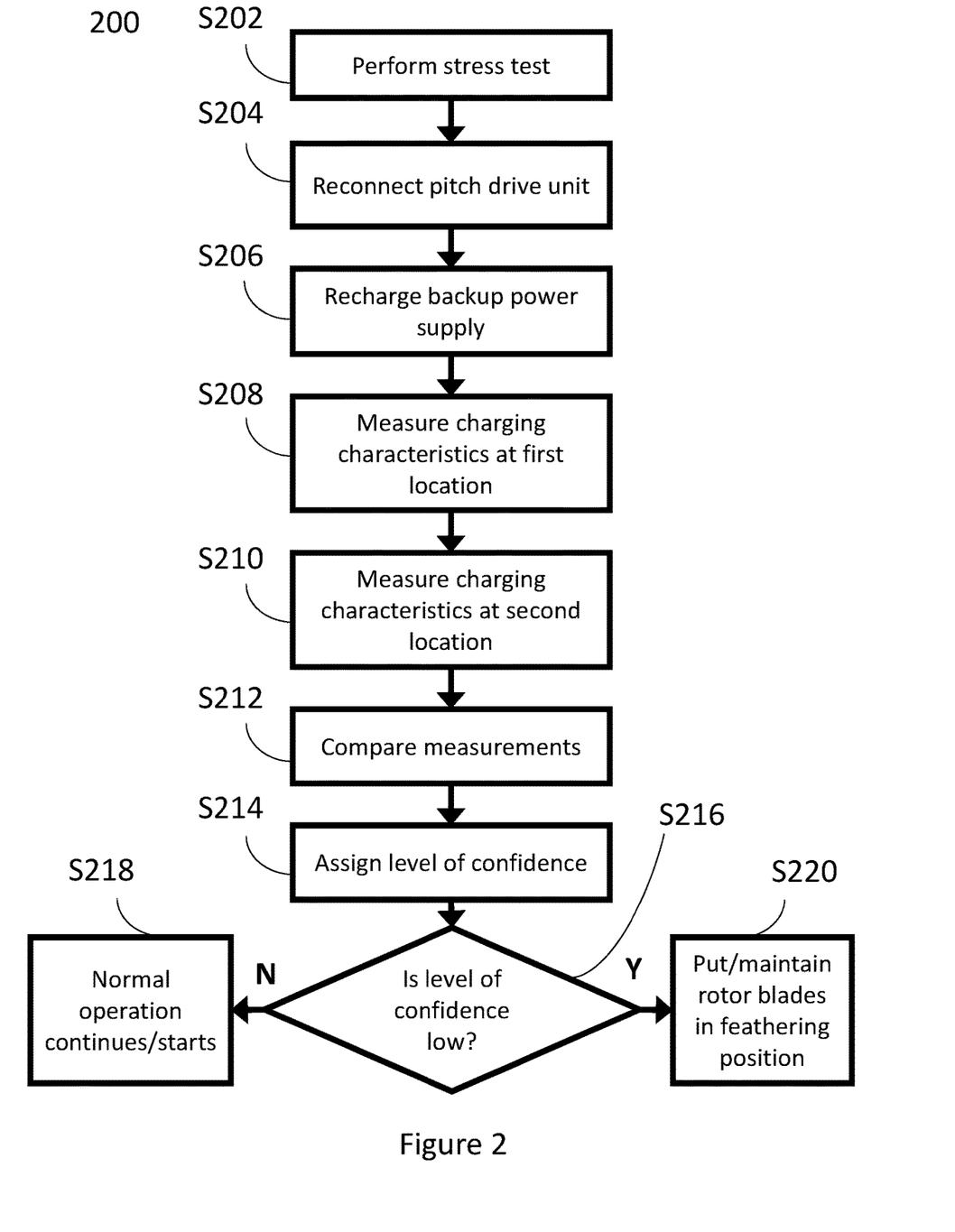
FIG. 2 shows a flow diagram of a method for assigning a level of confidence in measurements of a backup power supply condition.

FIG. 2 shows a flow diagram of a method 200 for assigning a level of confidence in measurements of a backup power supply condition. The method of FIG. 2 may be performed using the apparatus discussed above in relation to FIGS. 1A and 1B.

At step S202, a stress test is performed on a backup power supply such as the backup power supply 112 discussed above. The stress test may proceed according to a known method, for example, that discussed in patent application EP2824321. The stress test may involve the disconnection of a pitch drive unit from a mains power supply via an isolation switch as discussed above. At step S204, if the pitch drive has been disconnected from the central unit, it is reconnected such that current can be drawn by the backup power supply.

At step S208 the charging characteristics of the backup power supply are measured at a first location. The charging characteristics preferably comprise either the charging current of the backup power supply, the charging voltage of the backup power supply, or both. Preferably the measurement is performed by a first sensor unit such as the first sensor unit 114 discussed above. Preferably the first location is a point within the pitch drive unit corresponding to the backup power supply being assessed as described above.

At step S210 the charging characteristics of the backup power supply are measured at a second location. Preferably the measurement is performed by a second sensor unit such as the second sensor unit 116 discussed above. Preferably the second location is a point within the wind turbine that is remote from the first sensor unit, for example within the central unit as described above.

It is noted that step S208 may be performed before step S210 or vice versa. More preferably, steps S208 and S210 are performed simultaneously, thereby allowing accurate determination of measurement reliability in situation in which the charging current and/or voltage varies over time. Furthermore, preferably steps S208 and S210 are repeated over a certain time interval, such that the profile of charging current and/or voltage over time can be measured, and the reliability of measurement corresponding to different parts of the profile can be determined.

At step S212 the measurements made in steps S208 and S210 are compared. For example, the charging current measured by a first sensor unit is compared to the charging current measured by a second sensor unit. In some embodiments, the comparison involves calculating a percentage difference between the values. In other embodiments the comparison involves calculating an absolute difference between measured values. Other methods for comparing values may be employed as are known in the art.

Based on the comparison performed in step S212, a level of confidence is assigned to the measurement at the first location and/or the measurement at the second location in step S214. The level of confidence provides an indication of whether the measurements taken by the first and/or second sensor unit are trustworthy, i.e. plausible, as described above in relation to FIGS. 1A and 1B. In some embodiments the level of confidence is assigned to values measured by a first sensor unit located at a pitch drive unit. In some embodiments a difference in the measured values of 10% or less may be assigned a high level of confidence, whereas a difference of more than 10% may be assigned a low level of confidence.

Alternatively, the distinction between a high level of confidence and a low level of confidence may be associated a different threshold value other than 10%, for example a difference between measured values of 5%, or 15% or 20%. Alternatively, more than two levels of confidence may be utilised, wherein more than one threshold value is used to define the level of confidence—for example a difference of 10% or less might be assigned a high level of confidence, a difference of between 10% and 20% an intermediate level of confidence, and a difference of more than 20% a low level of confidence—in such cases, a high level of confidence would indicate that the measurement at the first (and/or second location) is trusted and no action need be taken, an intermediate level may provide a warning indicating that more measurements should be taken to ascertain the reliability of one or more sensor units making the measurements, and a low level indicating that one or more sensor units cannot be trusted and requires replacement or maintenance. Similarly other comparison values, such as an absolute difference can be used to assign a level of confidence (for example a high level of confidence may be assigned if the absolute difference is below a threshold value, and a low level if the difference is above the threshold).

At step S216, a course of action is chosen based on the level of confidence assigned in step S214.

If the level of confidence is not low (i.e. a high level of confidence or in some embodiments an intermediate level of confidence is assigned), the method proceeds to step S218, in which normal operation of the wind turbine can continue. In some embodiments, and indication can be provided to a user that the measurement is trusted at step S218. As noted above, in some embodiments the measurements can be made by the first and second sensors when the wind turbine is in an idle mode. In this case, at step S218 the wind turbine may leave its idle mode such that the rotor blades are pitched out of their feathering positions, and start normal operation.

If the level of confidence is low, the method proceeds to step S220, in which the wind turbine is put into a safe state. Preferably this involves putting the rotor blades into a feathering position using the pitch drive motors present in the wind turbine, thus making the blades act to retard the rotation of the turbine such that no further power is generated and the turbine is put in an idle mode. Advantageously this acts to reduce the risk of damage to the environment, persons or equipment in the event that it cannot be verified that the emergency backup power supply is working correctly. Preferably at step S220 an indication that the functionality of the backup power supply cannot be verified is automatically provided to service personnel, who may then make provisions to have one or both of the sensor units replaced or repaired as appropriate. In some embodiments, measurements may be made by the first and second sensors when the wind turbine is already in an idle mode as discussed above. In this case, at step 220 the wind turbine is kept in an idle state in which the blades are kept in feathering positions.

Put differently, a decision is made on whether or not to feather the rotor blades of the wind turbine and put it into a safe, idle, mode (or maintain the wind turbine in an idle mode, if already in an idle mode) in response to the plausibility check based on whether or not a difference in values measured by the first and second sensor unit exceeds a predetermined threshold value or not.

The above discussion describes specific embodiments of the present invention. As noted above wind turbine 100 shown in FIG. 1B is preferably the same wind turbine 100 as shown in FIG. 1A, and accordingly features discussed in relation to FIG. 1A or FIG. 1B are compatible when implementing the present invention. Furthermore, the method 200 of FIG. 2 can preferably be applied to the wind turbine 100 as shown in FIGS. 1A and 1B. Further aspects of the present invention will be understood from the appended claims.

The invention claimed is:

1. A wind turbine comprising:
   a backup power supply;
   a processor; and
   a first sensor unit and a second sensor unit configured to measure at least one of a voltage value and a current value, wherein the voltage value and current value are indicative of a condition of the backup power supply;
   wherein the first sensor unit is configured to measure the at least one of the voltage value and the current value at a first location in the wind turbine;
   wherein the second sensor unit is configured to measure the at least one of the voltage value and the current value at a second location in the wind turbine different from the first location; and
   wherein the processor is configured to:
      compare the at least one of the voltage value and current value measured by the first sensor unit with the at least one of the voltage value and current value measured by the second sensor unit;
      assign a level of confidence to the at least one of the voltage value and current value measured by the first sensor unit based on the comparison; and
      cause the wind turbine to enter an idle state based on the level of confidence assigned.

2. The wind turbine of claim 1 wherein the first location is close to the backup power supply, and the second location is remote from the backup power supply.

3. The wind turbine of claim 2, further comprising:
   a control unit configured to control at least one pitch drive unit;
   wherein the first location is at the control unit and the second location is at the at least one pitch drive unit.

4. The wind turbine of claim 3, wherein the at least one pitch drive unit is configured to operate a pitch motor whilst the first and second sensor units are measuring the at least one of the voltage value and the current value and wherein the processor is further configured to:
   determine at least one of a pitch motor voltage, a pitch motor current, a current drawn by a brake chopper, and voltage associated with the brake chopper, a current drawn by a smoothing capacitor and a voltage associated with a smoothing capacitor; and
   compare the at least one of the voltage value and current value measured by the first sensor unit with the at least one of the voltage value and current value measured by the second sensor unit, based on the at least one of the pitch motor voltage, the pitch motor current, the current drawn by the brake chopper, and voltage associated with the brake chopper, the current drawn by the smoothing capacitor and the voltage associated with the smoothing capacitor.

5. The wind turbine of claim 1, further comprising:
   a diode between the first location and second location, wherein the diode is provided to substantially allow current to flow in a first direction towards the backup power supply and substantially prevent current flowing in a second direction opposite to the first direction;
   wherein the processor is further configured to determine if the diode is operating correctly based on the comparison of the at least one of the voltage value and current value measured by the first sensor unit with the at least one of the voltage value and current value measured by the second sensor unit.

6. The wind turbine of claim 1 wherein the backup power supply is a supercapacitor that is charged by a primary power supply, wherein:
   the voltage value is a charging voltage of the supercapacitor; and
   the current value is a charging current drawn by the supercapacitor when charging the supercapacitor.

7. The wind turbine of claim 1 wherein: either
   the first sensor unit is a pre-existing sensor unit at the wind turbine, and the second sensor unit is retrofitted at the wind turbine; or
   the second sensor unit is a pre-existing sensor unit at the wind turbine, and the first sensor unit is retrofitted at the wind turbine.

8. The wind turbine of claim 7, wherein the retrofitted sensor unit has a higher safety integrity level (SIL) rating than the pre-existing sensor unit.

9. The wind turbine of claim 1 wherein the first and second sensor units are configured to measure the at least one of the voltage value and the current value when the wind turbine is in an idle mode.

10. The wind turbine claim 1 wherein the processor is further configured to determine whether at least one of the current value and the voltage value measured by the first sensor unit or the second sensor unit is indicative of the backup power supply needing repair or replacement; and
   wherein in response to determining that the backup power supply requires repair or replacement, the processor is further configured to cause the wind turbine to enter an idle state.

11. A method for monitoring the condition of a backup power supply in a wind turbine, comprising:
   measuring, using a first sensor unit, at least one of a voltage value and a current value at a first location in the wind turbine, wherein the voltage value and the current value are indicative of a condition of the backup power supply;
   measuring, using the second sensor unit, the at least one of the voltage value and the current value at a second location in the wind turbine different from the first location;
   comparing the at least one of the voltage value and current value measured by the first sensor unit with the at least one of the voltage value and current value measured by the second sensor unit;
   assigning a level of confidence to the at least one of the voltage value and current value measured by the first sensor unit based on the comparison; and
   operating the wind turbine to enter an idle state based on the assigned level of confidence.

12. The method of claim 11 wherein the step of measuring using the first sensor unit is performed at a control unit of the wind turbine, and wherein the step of measuring using the second sensor unit is performed at a pitch drive unit of the wind turbine.

13. The method of claim 12 further comprising:
   determining at least one of a pitch motor voltage and a pitch motor current; and
   comparing the at least one of the voltage value and current value measured by the first sensor unit with the at least one of the voltage value and current value measured by the second sensor unit, based on the at least one of the pitch motor voltage and the pitch motor current.

\* \* \* \* \*